United States Patent [19]

Ito et al.

[11] Patent Number: 4,537,271
[45] Date of Patent: Aug. 27, 1985

[54] RUNNING VEHICLE

[75] Inventors: Katsumi Ito, Osaka; Osami Fuziwara, Kishiwada, both of Japan

[73] Assignee: Kubota, Ltd., Osaka, Japan

[21] Appl. No.: 498,512

[22] Filed: May 26, 1983

[30] Foreign Application Priority Data

Oct. 27, 1982 [JP] Japan ................. 57-188386

[51] Int. Cl.³ ............... B60T 7/12; B62D 1/24; G08G 11/00
[52] U.S. Cl. .................... 180/131; 180/169; 343/7 VM
[58] Field of Search ............ 180/131, 169, 274, 275, 180/280; 343/7 VC, 7 VM; 340/53

[56] References Cited

U.S. PATENT DOCUMENTS

| | | | |
|---|---|---|---|
| 1,595,068 | 8/1926 | Booth | 293/2 |
| 2,729,299 | 1/1956 | Rink | 180/274 |
| 2,920,713 | 1/1960 | Paradise | 293/4 X |
| 3,011,580 | 12/1961 | Reid | 343/7 VM |
| 3,370,166 | 2/1968 | DaRold et al. | 180/169 X |
| 3,496,317 | 2/1970 | Reed | 200/DIG. 10 |
| 3,744,586 | 7/1973 | Leinauer | 180/169 X |
| 4,030,380 | 6/1977 | Mutter | 180/274 X |
| 4,102,426 | 7/1978 | Walden | 180/169 |
| 4,308,536 | 12/1981 | Sims et al. | 343/7 VM |

FOREIGN PATENT DOCUMENTS

| | | | |
|---|---|---|---|
| 2447859 | 4/1976 | Fed. Rep. of Germany | 180/274 |
| 836126 | 6/1960 | United Kingdom | 293/4 |

Primary Examiner—John A. Pekar
Attorney, Agent, or Firm—Cushman, Darby & Cushman

[57] ABSTRACT

A running vehicle having control means for judging whether an obstacle detected by a non-contact type obstacle sensor on a front portion of its body is at rest or in motion based on the result of detection and controlling the vehicle body so as to cause the body to detour the obstacle when it is at rest or to automatically stop the vehicle body when the obstacle is in motion.

11 Claims, 11 Drawing Figures

| 5A | 5B | Detection area | Amount of steering |
|----|----|----|----|
| ○ | × | A1 | O₁ |
| ○ | ○ | A2 | O₂ |
| × | ○ | A3 | O₃ |
| × | × | — | — |

○ ---- Presence of obstacle
× --- Absence of obstacle

RUNNING VEHICLE

BACKGROUND OF THE INVENTION

1. Field of the Invention

The present invention relates to a running vehicle, and more particularly to a running vehicle having an obstacle sensor of the non-contact type at a front portion of its body.

2. Description of the Prior Art

Conventional running vehicles of this type, for example, automatic mowers and like automatic running vehicles, require means for stopping the vehicle during running upon detecting an obstacle in front of the vehicle to avoid danger or collision. Such means consists essentially of a sensor for detecting obstacles reliably free of errors. Photosensors, ultrasonic sensors and like sensors of the non-contact type are used as such sensors.

The vehicle is so controlled that when the sensor detects an obstacle within its sensing area, the vehicle is immediately stopped unconditionally or caused to detour the obstacle in a pattern preset according to the position of obstacles.

However, the conventional control means has the following drawbacks.

The vehicle which is adapted to stop unconditionally upon the sensor detecting an obstacle has the drawback of being very low in work efficiency although danger is avoidable reliably.

On the other hand, the vehicle achieves a fairly high work efficiency when adapted for control to detour the obstacle detected, but if controlled to detour an obstacle in motion, the vehicle is likely to be subjected to unending detouring control depending on the direction of motion of the obstacle, with the resulting drawback that the vehicle will be deviated from the running course or strike against other bodies.

SUMMARY OF THE INVENTION

An object of the present invention, which has been accomplished in view of the above situation, is to provide a running vehicle having both functions of assuring safety and achieving a high work efficiency.

To fulfill the above object, the present invention provides a running vehicle having an obstacle sensor of the non-contact type and characterized in that the vehicle is provided with control means for judging whether an obstacle detected is at rest or in motion based on the result of detection and controlling the vehicle body so as to cause the body to detour the obstacle when it is at rest or to automatically stop the vehicle body when the obstacle is in motion.

Because of the above feature, the vehicle has the outstanding advantage described below.

When the sensor detects an obstacle during running, the control means judges whether the obstacle is at rest or in motion and controls the running vehicle in accordance with the result of detection, that is, causes the vehicle to automatically detour the obstacle if it is at rest, or automatically stops the vehicle if the obstacle is in motion. This assures safety reliably without resulting in a reduced work efficiency.

Other objects and advantages of the invention will become apparent from the following description.

BRIEF DESCRIPTION OF THE DRAWINGS

The drawings show running vehicles embodying the present invention.

DESCRIPTION OF THE PREFERRED EMBODIMENTS

Figure 1:
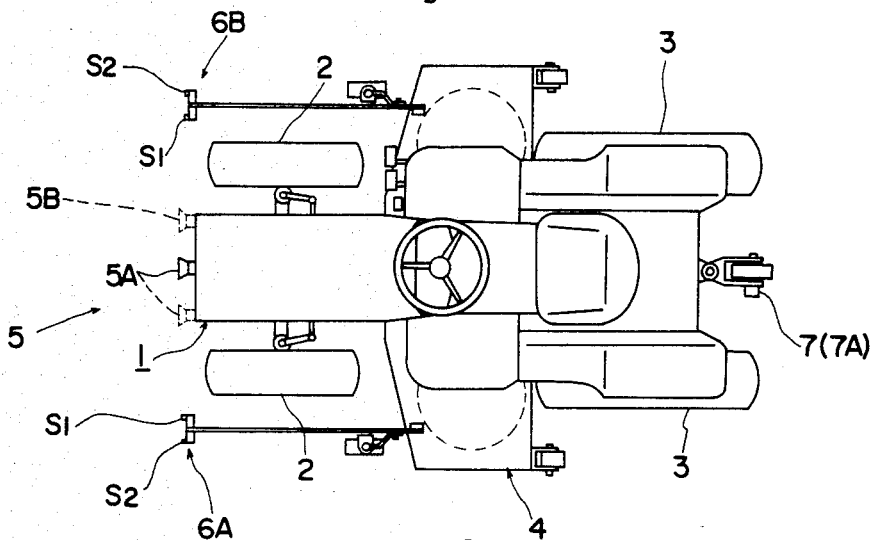
FIG. 1 is an overall plan view of a mower.

FIG. 1 shows an automatic mower as an example of running vehicle which can be driven without any driver. Between front wheels 2 and rear wheels 3, the body 1 of the behicle has vertically movably suspended therefrom a mower assembly 4 having cutting disk blades. The vehicle body 1 is provided at a front portion thereof with an ultrasonic sensor 5A as an obstacle sensor 5 of the non-contact type having the construction to be described later.

The vehicle body 1 is further provided with follower sensors 6A, 6B for detecting the boundary of a running area, i.e., the boundary between a mowed area and an unmowed area, and a fifth wheel 7A serving as a distance sensor for generating a pulse per unit running distance to continuously detect the distance of travel of the vehicle body 1.

Usually the front wheels 2, 2 are adapted by a hydraulic cylinder 8 to steer the vehicle rightward or leftward by a specified amount based on the result of detection of the boundary by the follower sensors 6A, 6B.

On the other hand, when an obstacle is detected by the ultrasonic sensor 5A, the front wheels are brought out of running control responsive to the follower sensors 6A, 6B and are controlled to detour the obstacle.

Figure 2:
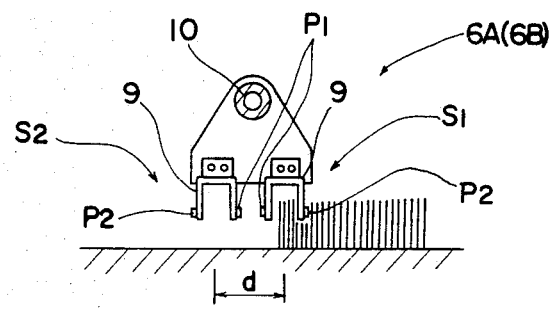
FIG. 2 is a fragmentary front view showing a follower sensor.

Each of the follower sensors 6A, 6B comprises a pair of photosensors $S_1$, $S_2$ of identical construction. As shown in FIG. 2, a sensor mount frame 10 attached to the mower assembly 4 is fixedly provided with substantially U-shaped sensor frames 9, 9 at a predetermined spacing d. Each sensor frame 9 has a pair of light-emitting element $P_1$ and photocell $P_2$ on the opposed inner sides thereof for detecting the presence or absence of grass to be brought into the space therebetween with the travel of the vehicle body 1 to discriminate between the mowed area and the unmowed area for the detection of the boundary.

Figure 3:
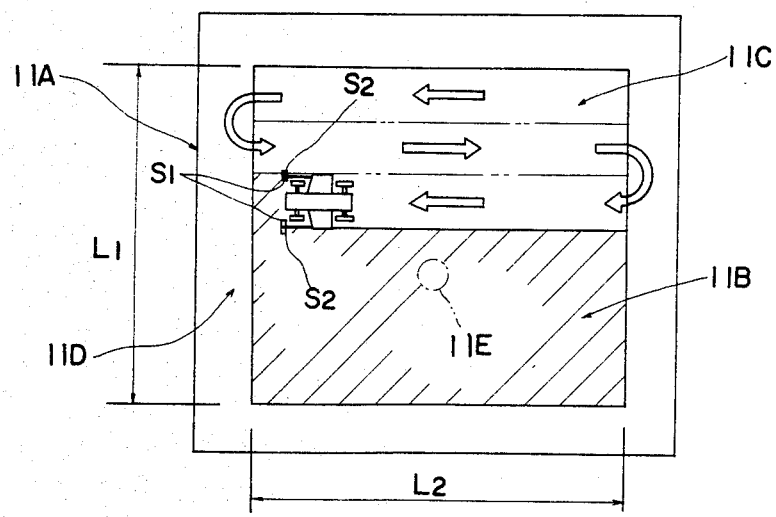
FIG. 3 is a diagram illustrating a mowing operation.

FIG. 3 shows how the vehicle is controlled for running, i.e., for mowing. When one of the follower sensors 6A, 6B composed of photosensors $S_1$, $S_2$ is in the unmowed area 11B, the vehicle is so steered for running that the outer photosensor $S_2$ only of the other follower sensor is positioned in the mowed area 11C. Upon reaching a turning area 11D around the mowing area 11A, the vehicle is turned toward the follower sensor which has been in the unmowed area. The turning area 11D is already made a mowed area, and the size of the mowing area 11A, i.e., the widthwise and lengthwise distances $L_1$ and $L_2$ have been measured. Upon the arrival of the vehicle at the turning area 11D, all the four photosensors $S_1$, $S_2$ and $S_1$, $S_2$ constituting the follower sensors 6A, 6B detect the mowed area, indicating the arrival. The running distance l continuously measured by the distance sensor 7, when compared with the pre-measured distance $L_2$ of the mowing area 11A, also indicates the arrival.

The dimensions $L_1$, $L_2$ of the mowing area 11A may be measured by manual measuring means, or by the outer periphery teaching means proposed in our prior application entitled "UNMANNED RUNNING WORK VEHICLE" (Japanese Patent Application No. 121564/1982).

The follower sensors 6A, 6B are not limited to those comprising photosensors $S_1$, $S_2$ but can be composed of other sensors of the non-contact type or any other type.

On the other hand, the ultrasonic sensor 5A detects an obstacle 11E by intermittently emitting ultrasonic waves over a specified range (at least not smaller than the width of the vehicle body including the mower assembly 4) forwardly of the vehicle body and receiving during the interval between the intermittent emission the waves reflected from the obstacle 11E. The sensor 5A also detects the distance $l_1$ from the vehicle body to the obstacle 11E based on the time taken for receiving the ultrasonic waves after emission.

Furthermore, the distance $l_0$ the vehicle body 1 travels during the time interval $t_0$ of the intermittent emission of ultrasonic waves is measured by the distance sensor 7 to estimate the distance $l_2$ to the detected obstacle 11E. The estimated distance $l_2$ is compared with the actual measured distance $l_1$ to judge whether the obstacle 11E is at rest or in motion.

The control system will be described below for automatically controlling the running of the mower based on the detection signals from the sensors 5A, 6A, 6B and 7 of the foregoing constructions.

Figure 4:
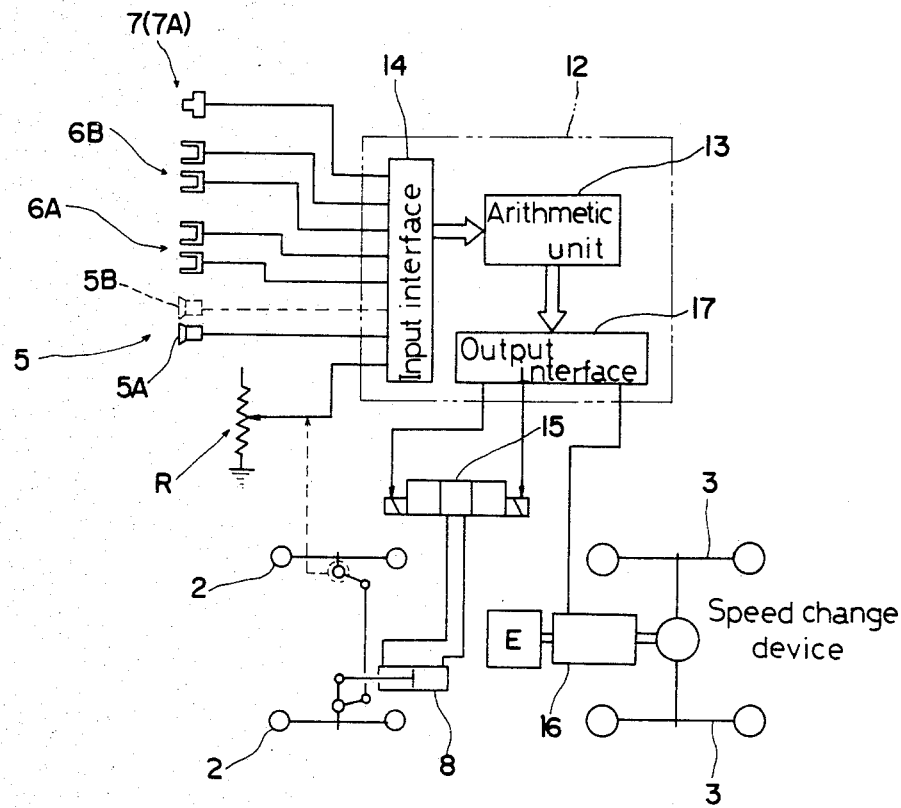
FIG. 4 is a block diagram showing a control system.

With reference to FIG. 4, a control device 12 comprises an arithmetic unit 13 the main portion of which is a microcomputer. The signals from the follower sensors 6A, 6B, the obstacle sensor 5 and the distance sensor 7 are fed to the arithmetic unit 13 via an input interface 14. Based on the signals form these sensors, the unit 13 performs an arithmetic operation and gives the result, i.e., control signals, to an output interface 17 to cause an electromagnetic value 15 to drive the hydraulic cylinder 8 which is an actuator, thus operating the front wheels 2, 2 and a speed change unit 16.

Usually the control device 12 steers the front wheels 2, 2 in response to the signals from the follower sensors 6A, 6B which discriminate between the unmowed area 11B and the mowed area 11C to run the vehicle body 1 along the boundary therebetween in the mowing area 11A under follower control as seen in FIG. 3.

On the other hand, when the obstacle sensor 5 detects an obstacle 11E on the running course surrounded by the turning area 11D during running, the vehicle body is subjected to obstacle detouring control in preference to the follower control based on the detection signals from the follower sensors 6A, 6B.

The obstacle detouring control will be described below.

When the obstacle 11E is detected by the ultrasonic sensor 5A serving as the obstacle sensor 5, the control device 12 reduces the running speed to a predetermined value and also repeatedly measures the distance $l_1$ from the vehicle body to the obstacle 11E with the ultrasonic sensor 5A.

After the running speed has been reduced, the distance $l_0$ the vehicle 1 travels during the time interval $t_0$ of the intermittent emission of ultrasonic signals by the ultrasonic sensor 5A is measured to calculate an estimated distance $l_2$ to which the distance between the vehicle body and the obstacle 11E changes during the time interval $t_0$.

Next, the actual distance $l_1$ to the obstacle 11E measured by the ultrasonic sensor 5A is compared with the estimated distance $l_2$. If the distance $l_1$ is within the range of allowable errors, $\pm \Delta$, relative to the estimated distance $l_2$, the control device determines that the obstacle is at rest and performs the detouring control as will be described below.

On the other hand, if the actual measured distance $l_1$ is outside the range of allowable errors, $\pm \Delta$, relative to the estimated distance $l_2$, the device determines that the obstacle is in motion and automatically stops the vehicle by operating the speed change unit 16.

When the obstacle 11E is at rest, the vehicle is controlled to detour the obstacle in the following manner.

Figure 6A:
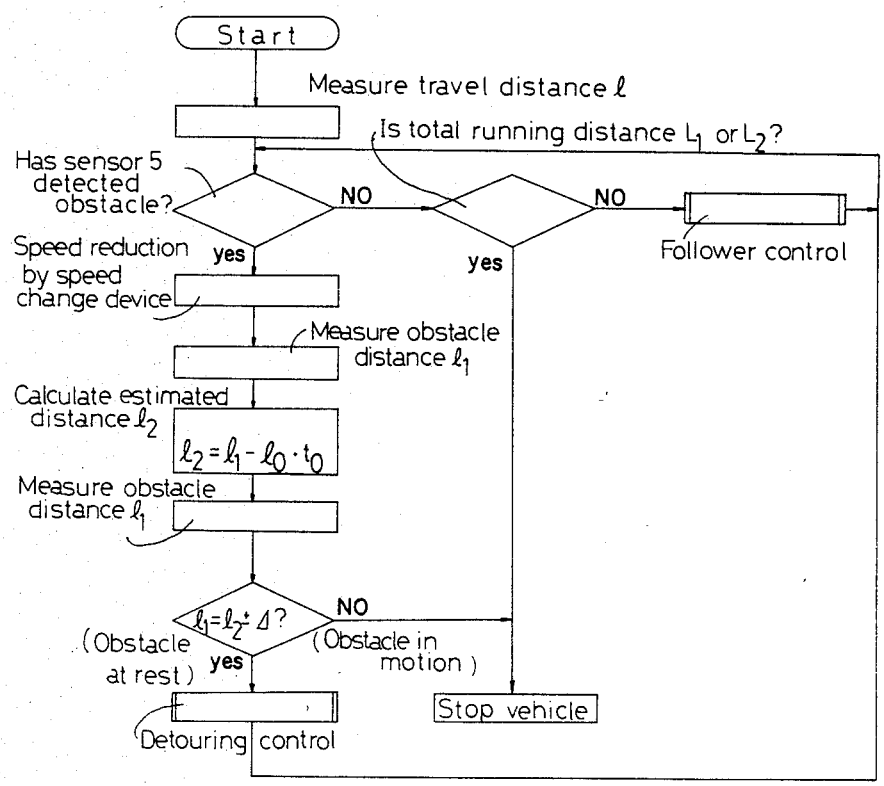
FIGS. 6 (A) and (B) are a flow chart showing the operation of the control system.
Figure 6B:
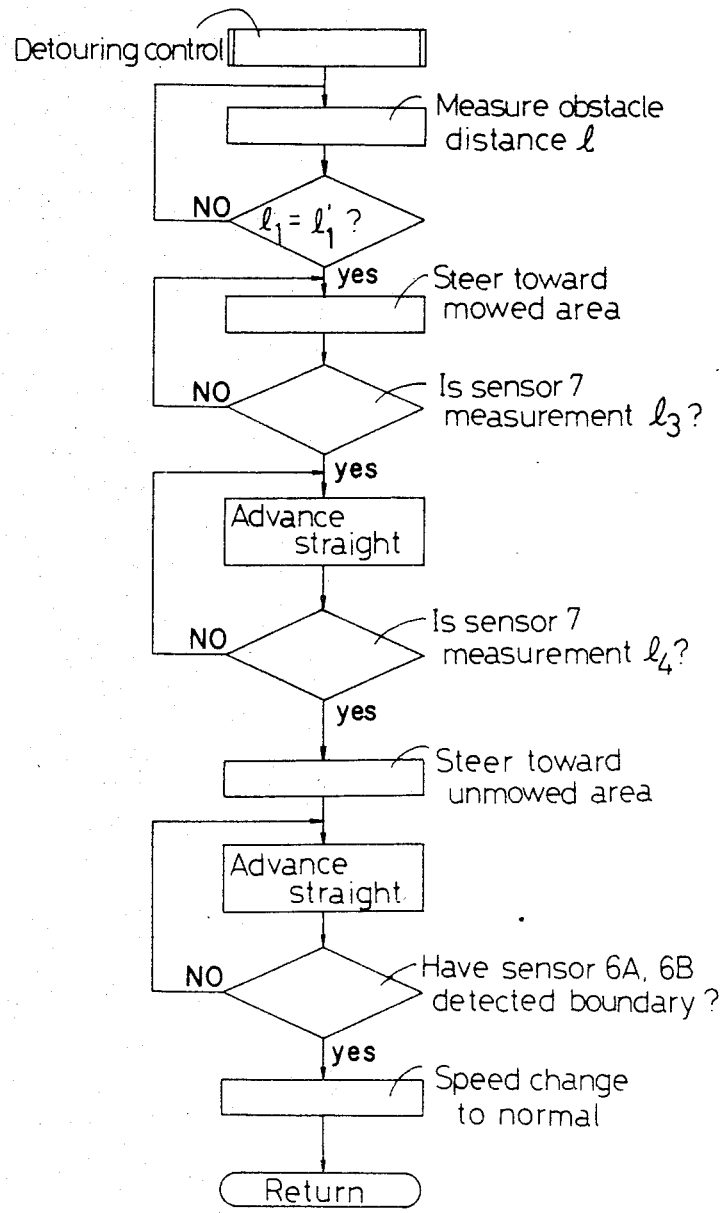

With reference to FIG. 6, the vehicle body is caused to approach the obstacle 11E while the ultrasonic sensor 5A is repeatedly measuring the distance $l_1$ to the obstacle 11E until the distance becomes equal to a predetermined distance $l_1'$, then advanced a predetermined distance $l_3$ with the front wheels 2, 2 steered toward the mowed area 11C, further advanced a predetermined distance $l_4$ straightforward, thereafter steered reversely toward the unmowed area 11B and thereby returned to the specified running course to detour the obstacle 11E.

The vehicle body is thereafter driven under the usual follower control along the boundary detected by the follower sensors 6A, 6B for continued mowing.

Indicated at R in FIG. 4 is a potentiometer for detecting the amount of steering. FIGS. 6 (A) and (B) are a flow chart showing the operation of the control device 12.

Figure 5:
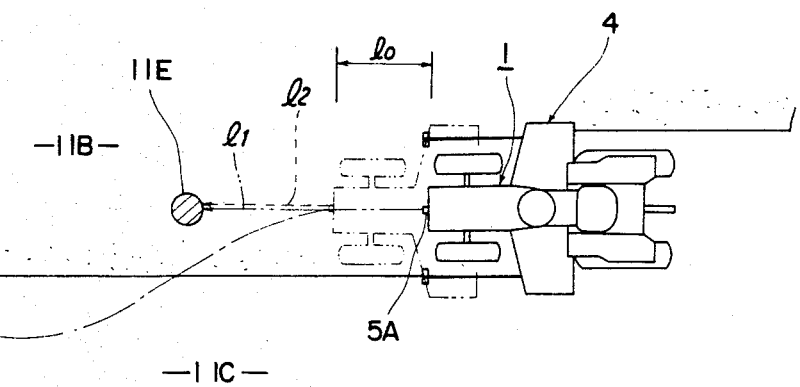
FIG. 5 is a diagram illustrating how an obstacle is detected.

Another embodiment of the invention will be described next. With respect to hardware, this embodiment has the same construction as the first embodiment except that the obstacle sensor 5 comprises two opposite ultrasonic sensors 5A, 5B as indicated in broken lines in FIGS. 1 and 5.

Figures 7, 8:
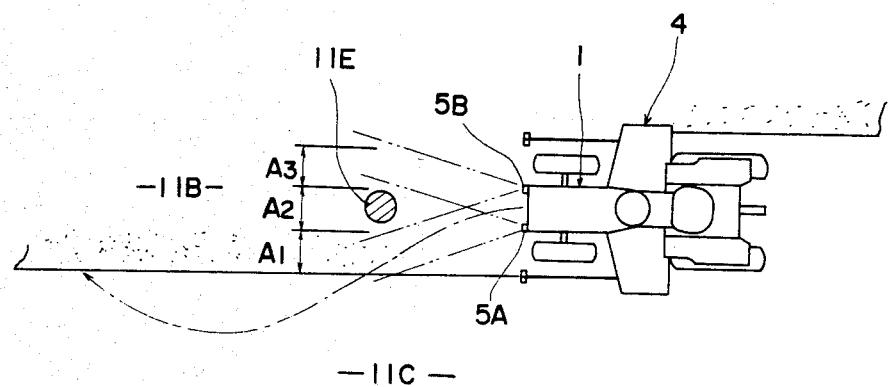
FIG. 7 is a diagram illustrating how an obstacle is detected according to another embodiment.
FIG. 8 is a table for judging the position of obstacles.

As shown in FIG. 7, the position of an obstacle 11E is detectable by the two ultrasonic sensors 5A, 5B in three divided ranges arranged laterally of the vehicle body 1 to judge whether the obstacle is at rest or moving laterally of the vehicle body 1. The vehicle body is controlled to efficiently detour the obstacle in accordance with the position of the obstacle if it is at rest or to automatically stop if the obstacle is in motion.

More specifically, upon the detection of the obstacle 11E by one of the ultrasonic sensors 5A and 5B while the vehicle body 1 is automatically running on a predetermined course along the boundary detected by the follower sensors 6A, 6B, the control device determines the position $A_1, A_2, A_3$ of the obstacle 11E and determines the amount M of steering required for detouring the obstacle 11E with reference to a detection area discriminating table shown in FIG. 8.

The ultrasonic sensors 5A, 5B repeatedly detect the position of the obstacle 11E to check whether or not there is a change in the position determined with reference to the detection area discriminating table. When there is no change in the position, it is determined that the obstacle is at rest, whereupon the front wheels 2, 2 are steered toward the mowed area by the predetermined amount M for the vehicle body to detour the obstacle 11E for automatic running.

On the other hand, a change in the position of the obstacle 11E, if found during repeated detection, indicates that the obstacle is in motion, so that the vehicle body 1 is automatically stopped.

Figure 9A:
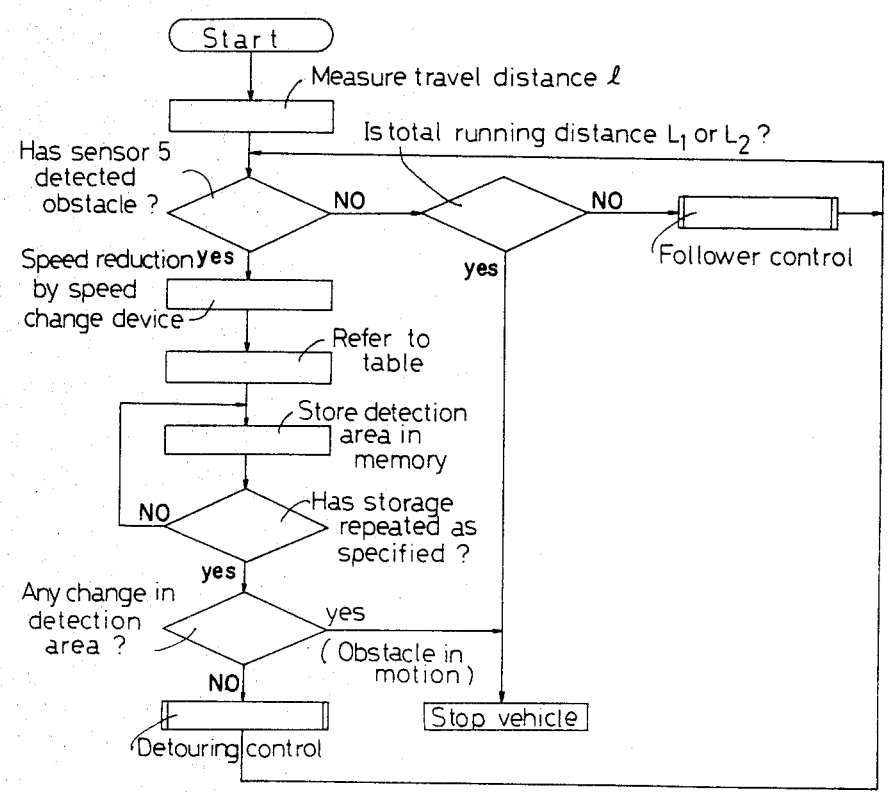
FIGS. 9 (A) and (B) are a flow chart showing the operation of the control system of the second embodiment.
Figure 9B:
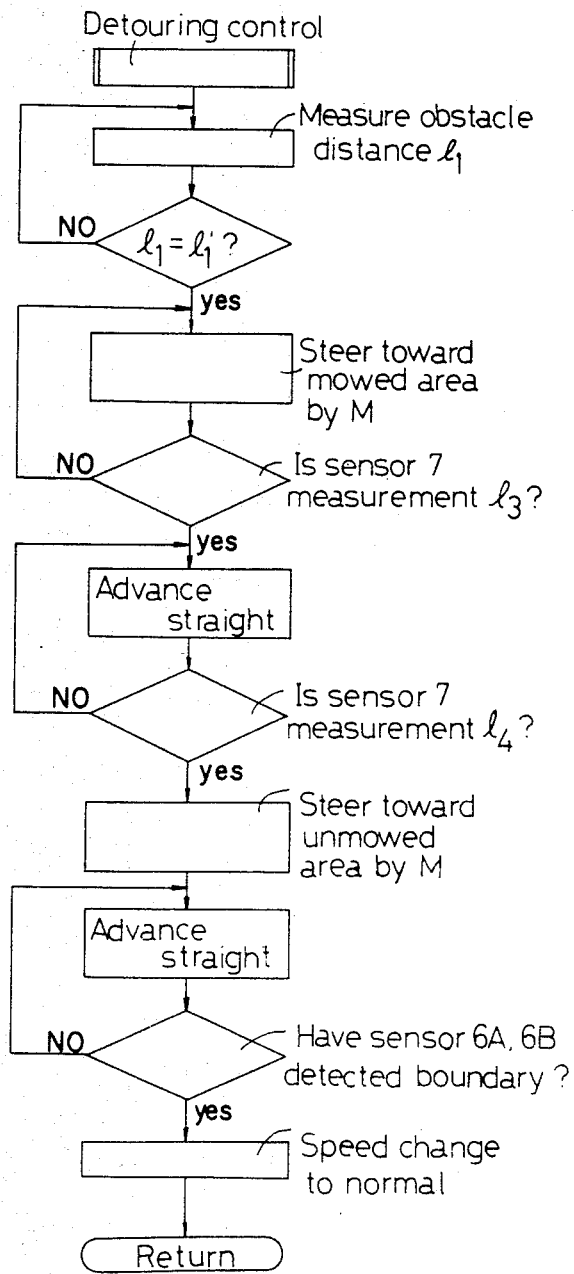

FIGS. 9 (A) and (B) are a flow chart showing the operation of the control device 12 for locating and detouring the obstacle 11E as described above.

We claim:

1. A self-propelled, unmanned running vehicle having a vehicle body moveable over a surface, said vehicle comprising:
    obstacle sensor means of the non-contact type disposed at a front portion of said vehicle body for detecting the presence of an obstacle in the path of movement of said vehicle body;
    signal generating means connected to said sensor means for determining whether the detected obstacle is at rest or is in motion and for generating in response thereto a rest-detection signal or a motion detection signal, respectively; and
    control means operatively interconnecting said vehicle body and said signal generating means and receiving said generated rest detection and motion-detection signals, said control means for (a) causing the vehicle body to detour the detected obstacle in response to receiving said rest-detection signal, and (b) stopping the movement of the vehicle body in response to receiving said motion-detection signal.

2. A running vehicle as defined in claim 1 wherein said signal generating means includes (i) measuring means for measuring a distance $l_1$ from the vehicle body to the obstacle detected by said sensor means repeatedly at a predetermined time interval $t_0$ and (ii) judgment means for judging whether the obstacle is at rest or in motion based upon whether or not the measured distance $l_1$ differs from an estimated distance $l_2$ to the obstacle which varies in corresponding relation to the variation in the distance $l_0$ of travel of the vehicle body per said predetermined time interval $t_0$.

3. A running vehicle as defined in claim 1 wherein said obstacle sensor means includes a plurality of lateral obstacle sensor means each of the non-contact type arranged side by side laterally of the vehicle body for detecting positions $A_1$, $A_2$, $A_3$ of the obstacle laterally of the vehicle body in a plurality of ranges, and wherein said signal generating judges whether the obstacle is at rest or in motion based upon whether or not there is a change in the position $A_1$, $A_2$, $A_3$ of the obstacle repeatedly detected at a predetermined time interval $t_0$.

4. A vehicle as in claim 1 for treating areas on the surface and further comprising boundary detection means operatively connected to said steering means through said control means for detecting a boundary region between untreated and treated areas of said surface, said control means causing said steering means to steer said vehicle body along an untreated area in response to said detected boundary region.

5. A vehicle as in claim 4 wherein said control means, in response to receiving said rest-detection signal, includes means for causing said vehicle to steer towards said treated area and away from said untreated area and means operative after a predetermined time interval for causing said vehicle to return to said untreated area whereby said obstacle is avoided.

6. A self-propelled, unmanned running vehicle having a vehicle body steerably moveable along a path over a surface, said vehicle comprising:
    steering means for steering said vehicle body along said path;
    brake means for braking said vehicle body to bring said vehicle body to a stop;
    sensor means for detecting the presence of an obstacle in the path of movement of the vehicle body;
    signal generating means connected to said sensor means for sensing whether the detected obstacle is at rest or in motion and for respectively generating in response thereto a rest-detection signal or a motion-detection signal; and
    control means operatively interconnecting said signal generating means with said steering means and said braking means, said control means for (a) causing said steering means to steer said vehicle body away from said detected obstacle in response to said control means receiving said rest-detection signal, and (b) causing said brake means to bring said vehicle body to a stop in response to said control means receiving said motion-detection signal.

7. A running vehicle as in claim 6 wherein said control means includes delay means permitting said vehicle body to be moved towards said detected obstacle in response to said control means receiving said motion-detection signal until said detected obstacle is a predetermined distance away from said vehicle body, said control means thereafter causing said braking means to stop said vehicle body upon said predetermined distance being reached.

8. A running vehicle as in claim 7 further comprising speed-change means for changing the running speed of said vehicle along said path.

9. A running vehicle as in claim 8 wherein said control means is further operatively connected to said speed-change means, said control means for causing said speed-change means to slow the running speed of said vehicle body in response to said control means receiving said motion-detection signal.

10. A self-propelled vehicle controllable to avoid an obstacle comprising a plurality of obstacle sensors each having a respective sensing area transversely of the vehicle and obstacle detection means for judging the presence obstacles, said obstacle detection means comprising:
    means to determine a position of an obstacle by measuring a distance to the obstacle when at least one of said sensors detects the presence of said obstacle thereby defining a transverse range of the obstacle relative to the vehicle and for deciding the position of the obstacle on the basis of said distance and said transverse range;
    pattern means to determine a direction and distance pattern of movement of the obstacle during a predetermined time interval in response to at least one of said sensors continually detecting the obstacle, said pattern means determining said pattern on the basis of (i) a position of the obstacle being determined at a first time, (ii) a position of the obstacle being determined at a second time, and (iii) a distance the vehicle has advanced during said time interval between said first and second times, and
    control means for outputting steering instructions and speed-change instructions, said control means for causing said vehicle to slow down to a predetermined speed by outputting said speed-change instructions upon detection of the obstacle by at least one of said sensors and thereafter, at a predetermined distance to the obstacle, for steerably controlling movement of said vehicle by outputting said steering instructions to cause said vehicle to either (a) detour in response to said pattern means determining that the obstacle is at rest or (b) to stop the vehicle when said pattern means determines that the obstacle is in motion.

11. A self-propelled vehicle controllable to follow a path and to avoid obstacles comprising a plurality of obstacle sensor means arranged on the vehicle so as to establish respective different sensing areas transversely of the vehicle, boundary sensor means for detecting a boundary between a treated region and an untreated region, distance sensor means for detecting a traveling distance of the vehicle, and obstacle-detection means for judging the presence of obstacles, said obstacle-detection means including:

means to actuate said obstacle sensors at a predetermined time interval, determining means to determine a position of an obstacle by measuring a distance to the obstacle when at least one of said obstacle sensors detects the obstacle and to define a transverse range of the obstacle relative to the vehicle by a combination of said obstacle sensors, said determining means for deciding the position of the obstacle on the basis of said distance and said traverse range, pattern means to determine a direction and distance pattern of movement of the obstacle during said time interval when at least one of said obstacle sensors continually detects the obstacle on the basis of (i) the position of the obstacle being determined at a first time, (ii) the position of the obstacle being determined at a second time, and (iii) a distance the vehicle has advanced during said time interval between said first and second times, and control means for controlling movement of said vehicle relative said detected obstacle, said control means, in response to said pattern means determining that the obstacle is at rest, for (a) causing the vehicle to sequentially advance to a predetermined distance to the obstacle, steer toward the treated region, advance a predetermined distance, steer toward the untreated region, and finally return to an original traveling mode following said path upon detection by said boundary sensor means of said boundary between the treated region and the untreated region, and (b) for stopping the vehicle when said pattern means determines that the obstacle is in motion.

* * * * *